No. 869,143. PATENTED OCT. 22, 1907.
R. M. G. PHILLIPS.
TRANSMISSION GEARING.
APPLICATION FILED DEC. 28, 1905.
2 SHEETS—SHEET 2.
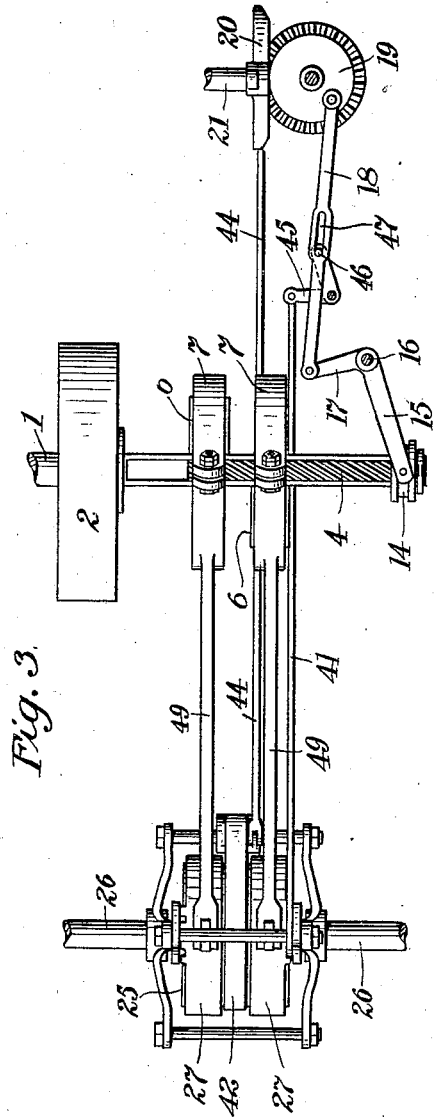
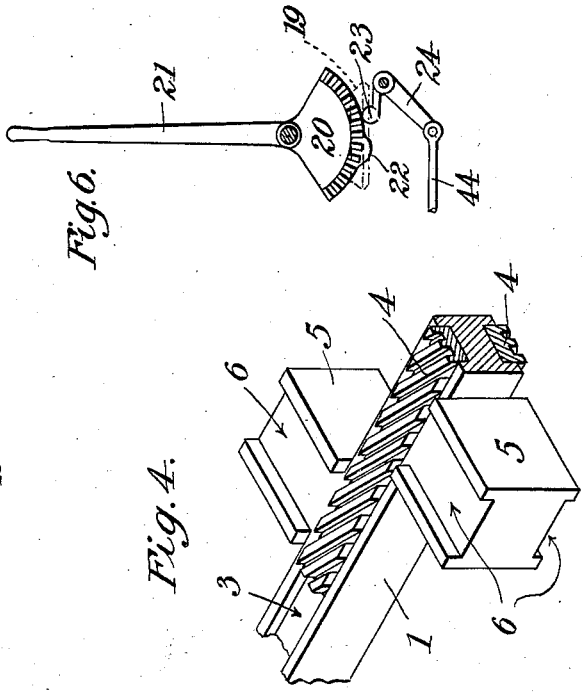
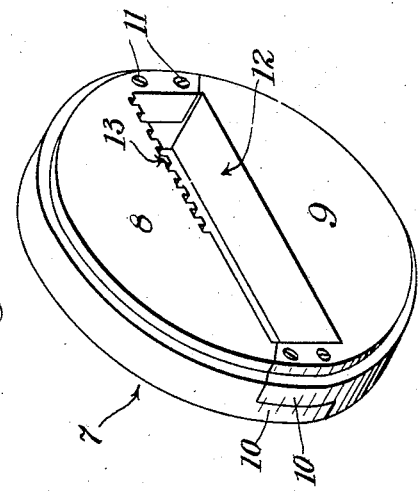
Witnesses:
E. V. McWain
L. Raymond Lyon
Inventor:
Ross M. G. Phillips

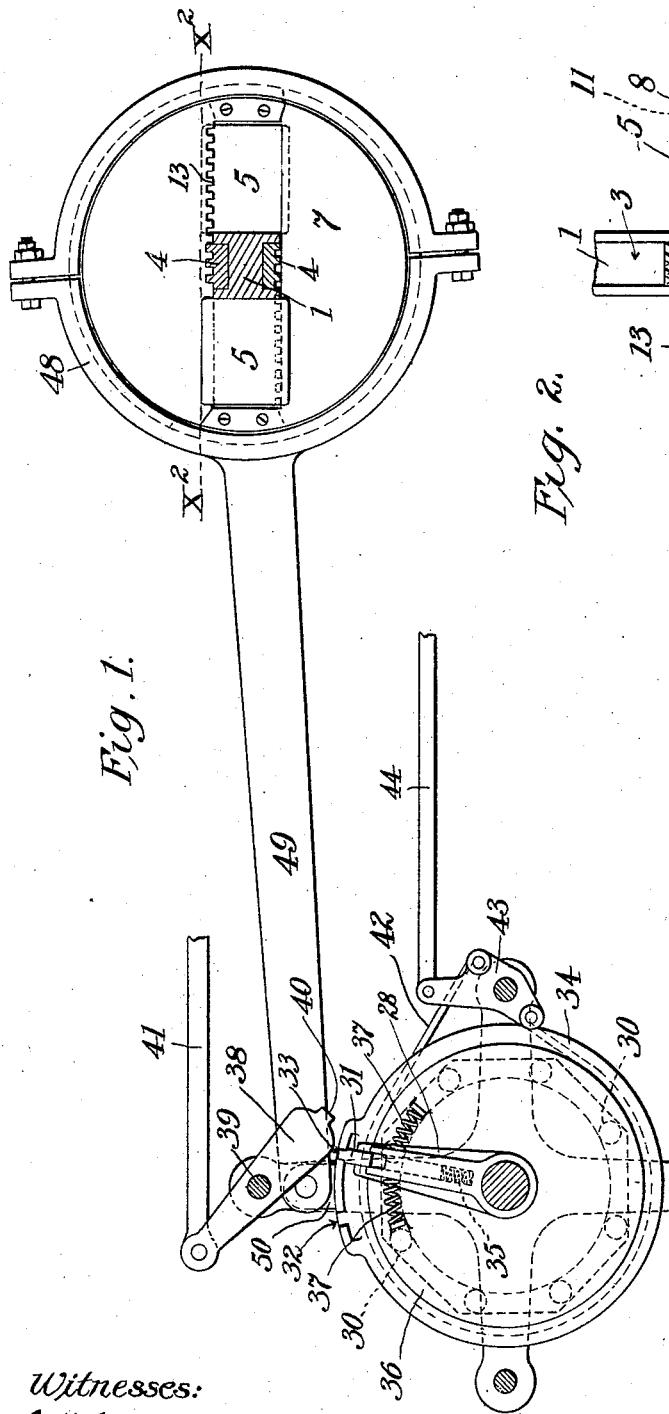

UNITED STATES PATENT OFFICE.

ROSS M. G. PHILLIPS, OF LOS ANGELES, CALIFORNIA.

TRANSMISSION-GEARING.

No. 869,143.   Specification of Letters Patent.   Patented Oct. 22, 1907.

Application filed December 28, 1905. Serial No. 293,605.

*To all whom it may concern:*

Be it known that I, Ross M. G. Phillips, a citizen of the United States, residing at Los Angeles, in the county of Los Angeles and State of California, have invented a new and useful Transmission-Gearing, of which the following is a specification.

This invention relates to a transmission adapted for general use in machinery, the device being particularly adapted for automobiles, trucks, hoists, etc. or other machinery.

The main object of the invention is to provide means for securing any desired rate of speed of the driven shaft without the use of gears or chains, and to apply power to the driven shaft with greater efficiency than heretofore. Devices of this nature have heretofore been constructed in which roller clutches have been operated by means of a link.

One of the principal objects of the present invention is to apply the power to the roller clutches by connections which extend directly from the power shaft.

The present invention comprises one or more eccentrics which are mounted on the power shaft and which are connected by eccentric rods with roller clutches which are mounted on the driven element with means for varying the eccentricity of the eccentrics from a maximum eccentricity to an absolute concentricity with the power shaft, the greatest angular throw of the roller clutches being obtained when the eccentrics are adjusted to their extreme eccentricity, the throw of the roller clutches being decreased as the eccentricity of the eccentrics is diminished, the movement of the roller clutches being *nil* when the eccentrics are adjusted to concentricity with the power shaft.

While it is possible to adjust the eccentrics in various ways, the form which I prefer and which I have shown in the drawings is to shift the eccentrics on a line radially of the power shaft, thus making it possible to accomplish the shifting movement by an extremely simple mechanism which operates positively and directly on the eccentrics whereby the adjustment may be made with least manual effort.

The accompanying drawings illustrate one form of the invention.

Referring thereto, Figure. 1 is a side elevation of the transmission with part of the adjusting connections removed, the power shaft being shown in section, the eccentrics being shown in neutral or concentric position. Fig. 2. is a cross section on line $X^2-X^2$ Fig. 1. Fig. 3. is a plan view of the transmission. Fig. 4. is a perspective view of a portion of the power shaft and operating racks. Fig. 5. is a perspective of an eccentric. Fig. 6. is a side elevation of the hand lever and adjacent connections, the intermediate bevel gear with which it engages, being shown in dotted lines.

1 designates the power shaft provided with fly wheel 2. A portion of the power shaft is squared and provided on opposite faces with grooves 3 in which grooves are slidably mounted shift racks 4, the teeth of which are obliquely disposed as clearly shown. Projecting from opposite sides of the shaft 1 are eccentric blocks 5, the upper and lower faces of each eccentric block being channeled to form ways 6, see Fig. 4. These eccentric blocks are preferably forged on the power shaft 1 and provide supports for eccentrics 7 each of which is slidably mounted on its respective block. As shown in Fig. 5. each eccentric comprises two members 8 and 9 which are provided with overlapping lugs 10 fastened together by screws 11.

Each member 8 and 9 is recessed to form a diametrical slot 12. One of the members 8 is provided with obliquely cut teeth 13 which mesh with the teeth of the shift rack 4. The inclination of the teeth is such that when the two shift racks 4 are moved in one direction the eccentrics are shifted in opposite directions radially of the power shaft. The large flat bearing faces of the channels 6 in the eccentric blocks 5 lie flush with the outer faces of the shift racks 4 so that the shifting movement of the outer eccentric is not hindered by the teeth of the lower shifting rack which passes through the slot of the outer eccentric adjacent the plane face of the slot, the teeth of which rack mesh with the teeth 13 of the next eccentric or one which is nearest the fly wheel. As both eccentrics are made alike both shift racks 4 may extend through both eccentrics and be of the same length although the shift rack which operates the outer eccentric may only be long enough to project into engagement with the rack of the outer eccentric when it is in extreme outer position. As the eccentrics are split it is a very easy matter to cut the teeth 13 as well as to form the slot, moreover the eccentrics may thus easily be assembled on the shaft or removed therefrom at any time without disturbing the shaft.

The outer ends of the shift racks 4 are connected to a grooved collar 14 which rotates with the power shaft. The shift racks 4 may be adjusted along the shaft by any desired mechanism which is adapted to the requirements of machinery or class of vehicle to which the device is applied. The shifting device shown comprises a forked lever 15 which engages the grooved collar 14 and having an arm 17 which is connected by a connecting rod 18 with a bevel gear 19, the latter being operated by a segmental gear 20 having a hand lever 21. The segmental gear has a rounded nose 22 which is adapted to depress the arm 23 to operate a lever 24.

25 is the drum of a differential gear which is mounted on the rear axle 26 and mounted on the drum 25 is a pair of reversible roller clutches 27 the construction of which may be of any preferred type.

28 designates a reversing arm which through the medium of any approved mechanism serves to hold the rollers 30 in one position to drive the drum 25 forward, and which when moved to its other position, shifts the rollers 30 in the clutch so that as the clutch operates it drives the drum in the opposite direction. The arm 28 is locked in either of its two positions by means of a bolt 31 which engages in either of the notches 32 or 33 which are formed on the outer casing 34 of the clutch. The bolt 31 is held extended normally by means of a coil spring 35 which is seated within the arm 28 below the end of the bolt 31.

36 designates a reversing or shifter plate and the reversing arm 28 is arranged to resiliently operate said plate by means of coil springs 37 which provides for any slight inaccuracy which may exist in the alinement of the notches 32 and 33 relatively to the contact seats in the clutch against which the rollers 30 take.

The lever 38 is shifted by means of a shifter 28 pivoted to a bar 39 having a boss 40. When the upper end of lever 38 is pulled forward one of its lower rounded faces bears down on top of the bolt 31 and forces it out of engagement with notch 33 and the boss 40 then contacts with the bolt 31 and thus swings back the lever 28 as the lever 38 is pulled forward thereby shifting the plate 36 through the medium of the rear spring 37. At the time the bolt 31 comes into register with the notch 32 the boss 40 rides over the top of the bolt 31 and the latter is forced up into the notch 32 by the spring 35 thus rocking the lever 28 into position. The lever 38 is operated by a rod 41 which extends forward and is connected to a bell crank lever 45 the latter having a pin 46 which projects into a slot 47 formed in the connecting rod 18.

Referring to Fig. 3. a brake band 42 may be arranged upon the differential drum between the roller clutches 27 and may be contracted or expanded by a lever 43. The lever 43 is connected by a rod 44 with an arm 24 so that as the lever 21 is moved back and the nose 22 depresses the arm 23 the arm 24 will be drawn forward and through the medium of the rod 44 will rock the lever 43 and tighten the brake band 42.

The eccentric has an eccentric strap 48 with an eccentric rod 49 which is connected with an ear 50 on the respective roller clutch case 27.

The arrangement of levers should preferably be such that when the hand lever 21 stands in vertical position as shown in Figs. 3 and 6 the shift racks 4 should be in an extreme outward position and the eccentrics 7 will be concentric with the shaft 3 so that as the latter rotates the eccentric will rotate freely within the eccentric strap without imparting any reciprocatory motion to the eccentric rod 49 so that the roller clutches will be stationary. By moving forward the hand lever 21, the shift racks 4 will be moved toward the fly wheel and acting upon the teeth 13 of their respective eccentrics will shift the latter in opposite directions and place them eccentrically of the shaft 3 so that motion will be imparted to the eccentric rods and the roller clutches will be oscillated through an arc of movement corresponding to the amount of eccentricity of the eccentrics. By throwing the hand lever 21 to its extreme forward position extreme eccentricity may be given to the eccentrics and the roller clutches will thereby be oscillated through their maximum arc thus driving the driven element, the rear axle, at maximum speed. Thus any degree of speed may be imparted to the driven element by adjusting or regulating the eccentricity of the eccentrics to the point desired, through the medium of the hand lever 21. The number of speeds which may thus be obtained is infinite. If the hand lever be moved back from the position shown in Fig. 6, as the connecting rod 18 swings over its dead center on the bevel gear 19 it will rock the lever 45 and through the rod 41 will operate the lever 38 and reverse the roller clutches and the driven element will thus be rotated in a reverse direction. The brake is momentarily applied as the nose 22 rides over the lever 23.

What I claim is:

1. A driven element, a plurality of oscillatory power transmitters for driving said element, a power shaft, a plurality of eccentrics on the power shaft, means operated by the eccentrics for driving said oscillatory power transmitters, and means comprising a rack having inclined teeth slidable on the power shaft for shifting said eccentrics radially of the power shaft while the power shaft is rotating.

2. A driven element, an oscillatory power transmitter for driving said element, a power shaft, an eccentric on the shaft, a connection from the eccentric to the oscillatory power transmitter, and means for varying the eccentricity of the eccentric, the latter means comprising a rack having oblique teeth and slidable longitudinally of the power shaft, the eccentric having oblique teeth which mesh with the teeth of the rack.

3. A driven element, an oscillatory power transmitter for driving said element, a power shaft, a split eccentric comprising two detachable members with a radial slot mounted on the power shaft, means operated by the eccentric for driving the oscillatory power transmitter, and means for shifting the eccentric radially of the power shaft, said latter means comprising a rack with oblique teeth mounted to slide longitudinally of the power shaft, one member of the eccentric having oblique teeth which mesh with the teeth of the rack.

Signed at Los Angeles Cal., this 21 day of December 1905.

ROSS M. G. PHILLIPS.

Witnesses:
CHARLOTTE M. PHILLIPS,
EFFIE L. PHILLIPS.